E. W. HOEFENER.
TRAVELING STOOL ATTACHMENT FOR BARBERS' CHAIRS.
APPLICATION FILED JULY 17, 1919.
1,352,409. Patented Sept. 7, 1920.
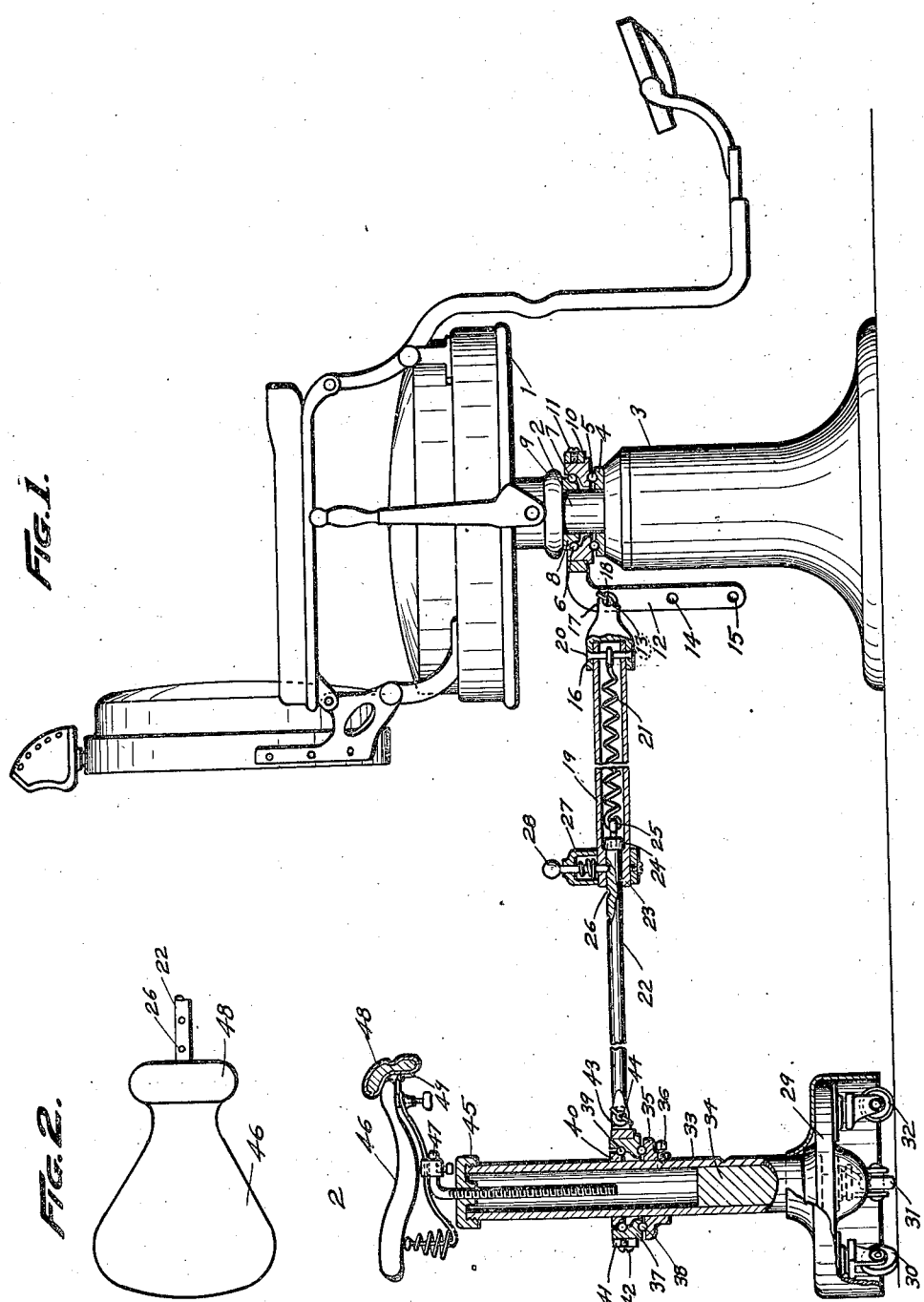

UNITED STATES PATENT OFFICE.

EDWARD W. HOEFENER, OF LOS ANGELES, CALIFORNIA.

TRAVELING STOOL ATTACHMENT FOR BARBERS' CHAIRS.

1,352,409.     Specification of Letters Patent.     Patented Sept. 7, 1920.

Application filed July 17, 1919. Serial No. 311,611.

*To all whom it may concern:*

Be it known that I, EDWARD W. HOEFENER, a citizen of the United States, residing at Los Angeles, in the county of Los Angeles and State of California, have invented new and useful Improvements in Traveling Stool Attachments for Barbers' Chairs, of which the following is a specification.

My object is to make a traveling stool attachment for a barber's chair, and my invention consists in the novel features herein shown, described and claimed.

Figure 1 is a side elevation of a barber's chair showing a traveling stool attachment embodying the principles of my invention in use, the attachment being shown in section.

Fig. 2 is a fragmentary to plan view of the stool seat as seen looking in the direction indicated by the arrow 2 in Fig. 1.

The barber's chair seat 1 is rigid with a swiveled reciprocating post 2, and the post 2 rotates in the pedestal or base 3. The ball bearing member 4 fits around the post 2 against the upper end of the pedestal 3 and has a ball race to receive the balls 5, the second ball bearing 6 rests upon the balls 5 and has a race for the balls 7, a third ball bearing member 8 rests upon the balls 7, and the bead 9 upon the post 2 rests upon the ball bearing member 8.

The ring 10 fits upon the center ball bearing member 6 and is held in place by a set screw 4. The hitching bar 12 extends downwardly from one side of the ring 10 outside of the pedestal 3 and has pinholes 13, 14 and 15 in a vertical line. The socket 16 has ears 17 straddling the hitching bar 12 and the bolt 18 is removably inserted through the ears 17 and through a desired one of the openings 13, 14 and 15 to connect the socket 16 to the hitching bar 12.

The spring casing 19 is inserted into the socket 16 and secured in place by a pin 20. The retractile coil spring 21 is connected to the pin 20 in the casing 19. A rod 22 slides through a bearing 23 at the outer end of the spring casing 19 and has a stop 24 on its inner end to engage the bearing and the spring 21 is connected to the eye 25 extending inwardly from the stop 24, the tension of the spring being exerted to pull the rod 22 into the casing 19.

Catch recesses 26 are formed in a row lengthwise of the rod 22. A housing 27 is fixed to the bearing 23, and a spring catch pin 28 is mounted in the housing to engage in the recess 26, so that the rod 22 may be drawn out to the desired extent and held in its adjusted position against the tension of the spring 21 by the catch pin 28.

The stool base 29 is mounted to run upon three casters 30, 31 and 32. The stool post 33 is a large pipe fixed in the base 29 and extending straight up to the desired height. A lead weight 34 is formed in the lower end of the post 33. A bearing member 35 fits upon the post 33 and is held in its adjusted position by a set screw 36. A second bearing member 37 fits loosely around the post 33 upon the balls 38 running in a ball race in the upper face of the member 35 and carries balls 39. The third bearing member 40 fits against the balls 39 and fits tightly upon the post 33. A ring 41 fits upon the bearing member 37 and is held in place by a set screw 42. An ear 43 extends from the ring 41 and is connected to the rod 22 by a bolt 44.

A cap 45 is screwed to the upper end of the post 33. A seat 46 is mounted upon the upper end of a seat post 47 like a bicycle seat, and the seat post 47 is adjustably screw seated through the cap 45. A pad 48 is connected to the forward part of the seat 46 by a spring hinge 49, said pad being in a position to hold the stool from colliding with and marring the barber's chair.

The barber will use the seat 46 and will adjust the distance between the seat 46 and the barber's chair to suit the work by manipulating the pin 28 and adjusting the length of the connection formed by the casing 19 and rod 22; then the stool attachment thus produced will travel in a circle around the barber's chair. The barber may sit upon the seat 46 with his feet upon the floor and cause the stool to travel or stand still as desired by manipulating his feet.

Thus I have produced a traveling stool attachment for a barber chair comprising means forming a swivel connection adapted to be applied to the barber seat post, a hitching bar extending from the swivel means, an adjustable connection adjustably connected to the hitching bar, a stool base mounted upon casters, a stool post extending upwardly from the base, a swivel connection between the stool post and the adjustable connection, and a stool seat upon the stool post.

Various changes may be made without departing from the spirit of my invention as claimed.

I claim:

1. A traveling stool attachment for a chair having a central supporting post comprising a swivel construction adapted to be applied to the supporting post, a hitching bar comprising two telescoping members connecting with the swivel construction and a stool mounted upon casters and connected swivelly with the outer end of the telescoping hitching bar whereby the stool may be rotated about the chair and with relation to said hitching bar and rolled toward or away from the chair.

2. In a traveling stool attachment for a chair having a central supporting post, a swivel construction mounted upon the supporting post of the chair, a hitching bar comprising a tubular member connected with the swivel construction and a bar adapted to telescope with the tubular member, a spring latch mounted on the outer end of the tubular member adapted to bear resiliently upon the telescoping member, and a stool fixed swivelly to the outer end of the bar having a seat and casters for the stool whereby the stool may be rotated about the chair or rolled toward or away from the chair by a bracing pressure of the feet upon the floor.

3. A traveling stool attachment for a chair constructed with a central supporting post including a traveling stool; a swivel joint connected to said post; a swivel joint adjustably connectible to said stool at different elevations; and a connecting member adjustably connectible at one end at different elevations to the joint on said chair post and connected at its other end to said joint on said stool.

In testimony whereof I have signed my name to this specification.

EDWARD W. HOEFENER.